United States Patent
Chang et al.

(10) Patent No.: US 10,891,077 B2
(45) Date of Patent: Jan. 12, 2021

(54) FLASH MEMORY DEVICE AND CONTROLLING METHOD THEREOF

(71) Applicant: MACRONIX INTERNATIONAL CO., LTD., Hsinchu (TW)

(72) Inventors: Hung-Sheng Chang, Taipei (TW); Hang-Ting Lue, Hsinchu (TW); Yuan-Hao Chang, Taipai (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 50 days.

(21) Appl. No.: 16/232,119

(22) Filed: Dec. 26, 2018

(65) Prior Publication Data

US 2020/0210102 A1    Jul. 2, 2020

(51) Int. Cl.
G06F 3/06        (2006.01)

(52) U.S. Cl.
CPC ............ G06F 3/0659 (2013.01); G06F 3/064 (2013.01); G06F 3/0611 (2013.01); G06F 3/0652 (2013.01); G06F 3/0679 (2013.01)

(58) Field of Classification Search
CPC ...... G06F 12/00; G06F 3/0659; G06F 3/0611; G06F 3/064; G06F 3/0652; G06F 3/0679; G06F 12/0246; G06F 2212/7205; G06F 2212/7207; G06F 2212/7203; G06F 2212/7202; G11C 16/10; G11C 16/04
USPC ......................................................... 711/103
See application file for complete search history.

(56) References Cited

U.S. PATENT DOCUMENTS

| 8,259,497 | B2* | 9/2012 | Shalvi | G11C 11/56 365/185.09 |
| 8,555,000 | B2* | 10/2013 | Jo | G06F 12/126 711/133 |
| 8,769,189 | B2* | 7/2014 | Li | G06F 12/0246 711/103 |
| 9,773,557 | B2 | 9/2017 | Goto et al. | |
| 2009/0157948 | A1* | 6/2009 | Trichina | G06F 12/0246 711/103 |
| 2010/0058003 | A1* | 3/2010 | Goto | G11C 7/10 711/154 |
| 2010/0211820 | A1* | 8/2010 | Kim | G06F 12/0246 714/5.1 |
| 2010/0325351 | A1* | 12/2010 | Bennett | G06F 12/0246 711/103 |

(Continued)

FOREIGN PATENT DOCUMENTS

TW        201544954 A      12/2015

*Primary Examiner* — Mano Padmanabhan
*Assistant Examiner* — Jean C Edouard
(74) *Attorney, Agent, or Firm* — McClure, Qualey & Rodack, LLP

(57) ABSTRACT

A flash memory device and a controlling method are provided. The flash memory device includes a memory array, an in-place update module, an out-of-place update module and a latency-aware module. The in-place update module is used for performing a program procedure or a garbage collection procedure via a bit erase operation or a page erase operation on the memory array. The out-of-place update module is used for performing the program procedure or the garbage collection procedure via a block erase operation or a migration operation on the memory array. The latency-aware module is used for determining a relationship between a first overhead of the in-place update module and a second overhead of the out-of-place update module.

20 Claims, 11 Drawing Sheets

(56) References Cited

U.S. PATENT DOCUMENTS

| | | | |
|---|---|---|---|
| 2013/0021846 A1* | 1/2013 | Rao | G11C 11/5621 365/185.03 |
| 2015/0153955 A1* | 6/2015 | Kwak | G11C 16/0466 711/103 |
| 2015/0177996 A1* | 6/2015 | Chang | G06F 12/0246 711/103 |
| 2015/0193169 A1* | 7/2015 | Sundaram | G06F 3/0641 711/103 |
| 2016/0085612 A1* | 3/2016 | Liu | G06F 11/0793 714/6.13 |
| 2016/0148694 A1* | 5/2016 | Chang | G11C 16/10 365/185.03 |
| 2017/0148526 A1* | 5/2017 | Li | G11C 16/26 |
| 2017/0357547 A1* | 12/2017 | Tsao | G06F 3/064 |

\* cited by examiner

| Block Erase Operation | 1 1 1 1<br>1 1 1 1 |

| Bit Program Operation | 1 ⓪ 1 ⓪<br>⓪ 1 ⓪ 1 |

| Bit Erase Operation | 1 0 1 ①<br>① 1 0 1 |

FLASH MEMORY DEVICE AND CONTROLLING METHOD THEREOF

TECHNICAL FIELD

The disclosure relates in general to a memory device and a controlling method thereof, and more particularly to a flash memory device and a controlling method thereof.

BACKGROUND

Along with the development of the memory technology, various memories are invented. Flash memory device is an electronic (solid-state) non-volatile memory that can be electrically erased and reprogrammed. The limitation of the traditional flash memory device is that, although it can be read or programmed a page at a time in a random access fashion, it can be erased only a block at a time. This generally sets all bits in the block to 1. Starting with a freshly erased block, any location within that block can be programmed. However, once a bit has been set to 0, it can be changed back to 1 only by erasing the entire block, i.e. block erase operation.

Please refer to FIG. 1, which shows a garbage collection procedure of a traditional flash memory device. Due to the block erase operation, one invalid page (or called used page) in one block cannot be individually erased to be a free page. So, the valid pages in this block are needed to be migrated and then this entire block is erased to create free pages. Frequently migration and erase may cause latency and endurance issues.

SUMMARY

The disclosure is directed to a flash memory device and a controlling method thereof. A novel Flash Translation Layer (FTL) having a latency-aware program mechanism, a latency-aware garbage collection mechanism, a cyclic endurance spreading mechanism and a hot-data-aware fine-granularity mechanism is provided to exploit a bit erase operation or a page erase operation of a bit-alterable flash memory array for resolving the latency and endurance issues.

According to one embodiment, a flash memory device is provided. The flash memory device includes a memory array, an in-place update module, an out-of-place update module and a latency-aware module. The in-place update module is used for performing a program procedure or a garbage collection procedure via a bit erase operation or a page erase operation on the memory array. The out-of-place update module is used for performing the program procedure or the garbage collection procedure via a block erase operation or a migration operation on the memory array. The latency-aware module is used for determining a relationship between a first overhead of the in-place update module and a second overhead of the out-of-place update module.

According to another embodiment, a controlling method of a flash memory device is provided. The flash memory device includes a memory array, an in-place update module, an out-of-place update module and a latency-aware module. The controlling method includes the following steps. A relationship between a first overhead of the in-place update module and a second overhead of the out-of-place update module is determined by the latency-aware module.

Figure 1:
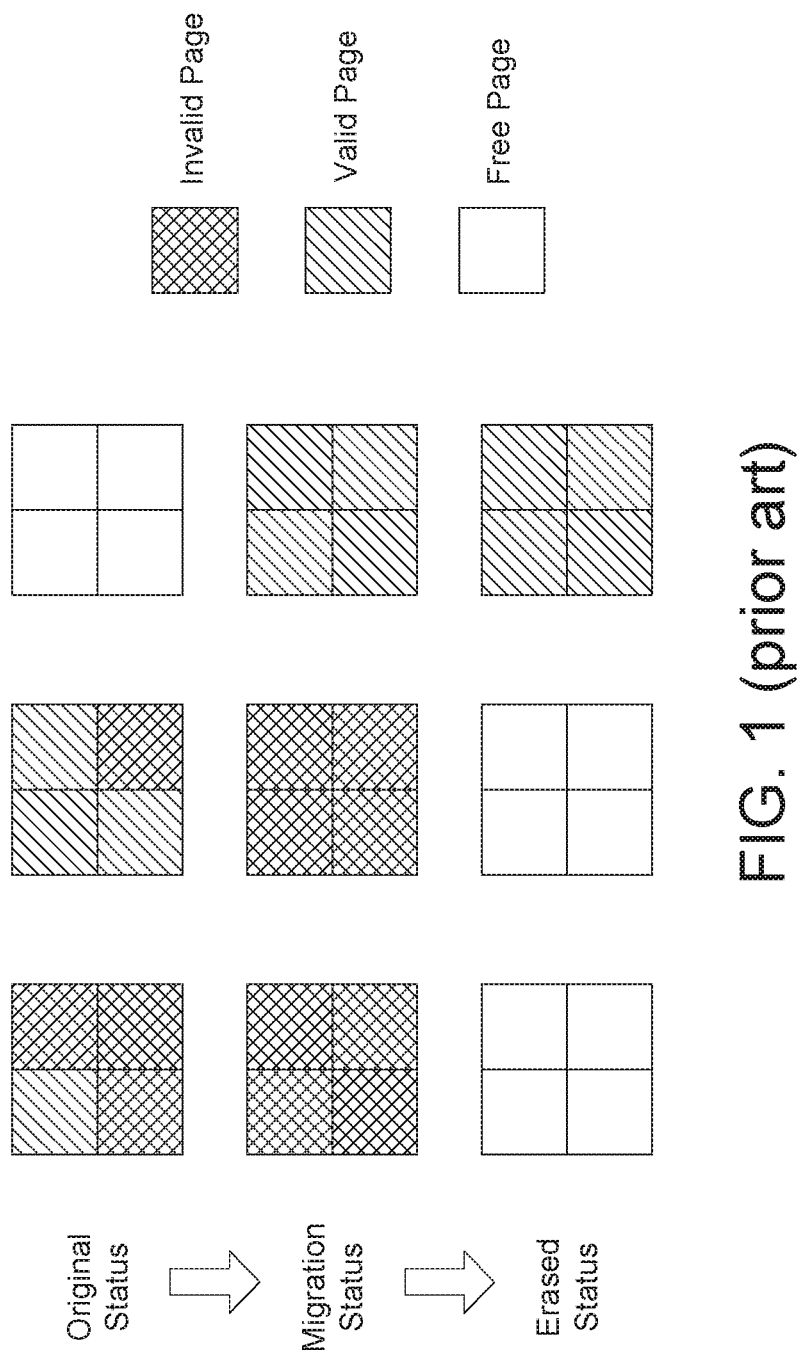
FIG. 1 (prior art) shows a garbage collection procedure of a traditional flash memory device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
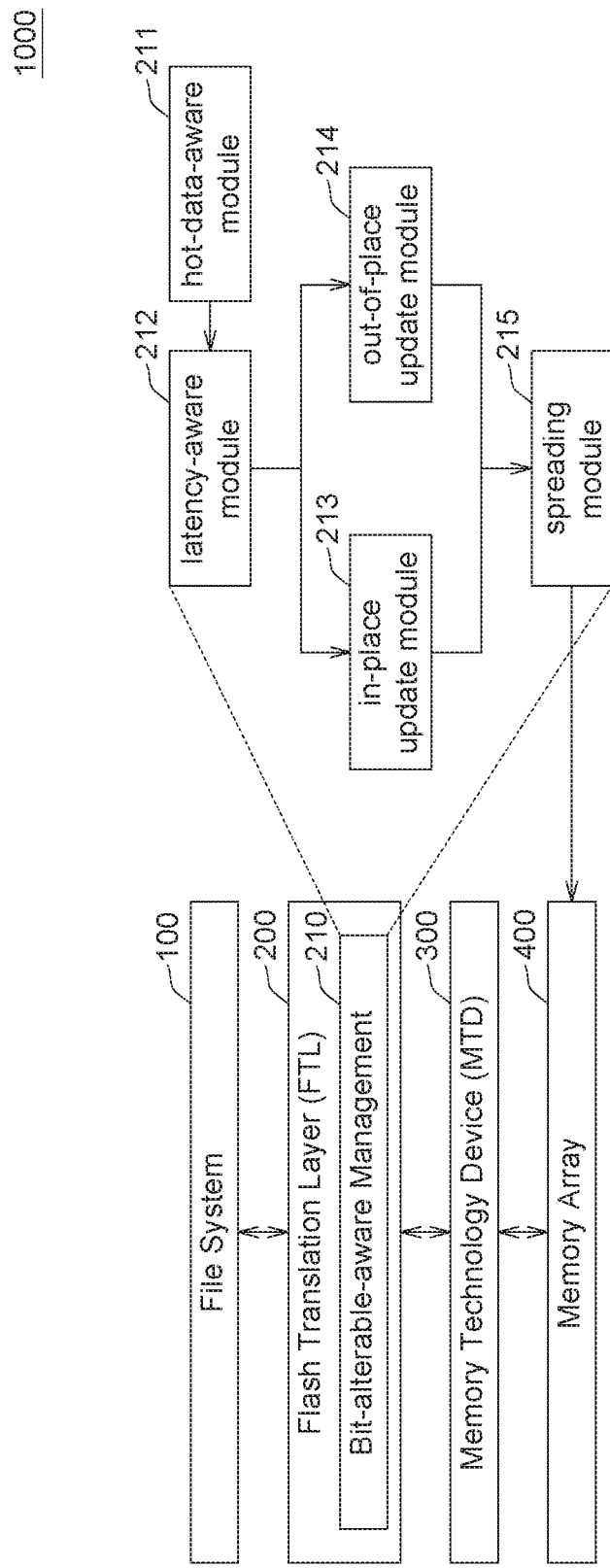
FIG. 2 shows a flash memory device according to one embodiment.

Please refer to FIG. 2, which shows a flash memory device 1000 according to one embodiment. The flash memory device 1000 includes a file system 100, a flash translation layer (FTL) 200, a memory technology device (MTD) 300 and a memory array 400. The memory array 400 is a bit-alterable flash memory array, which may be a NAND memory, a NOR memory, a 3D memory, a PCM or a ReRAM.

Figure 3A:
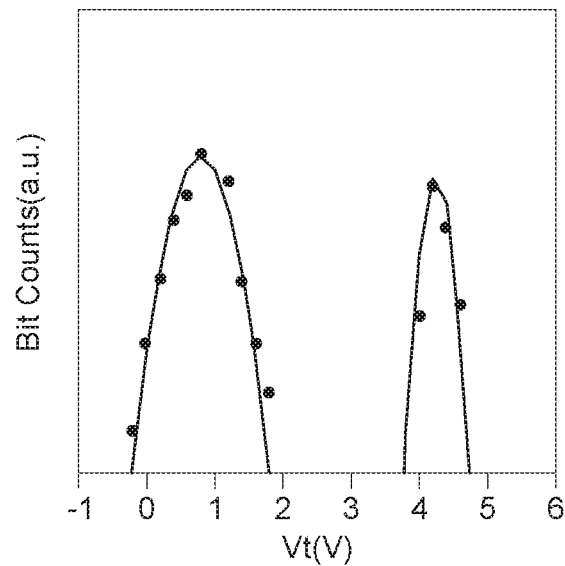
FIGS. 3A to 3B illustrate operations on a bit-alterable flash memory array.
Figure 3B:
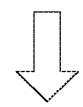
Figure 3B:
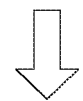

Please refer to FIGS. 3A to 3B, which illustrate operations of a bit-alterable flash memory array. In the bit-alterable flash memory array, +FN hole injection and −FN electron injection are used for programming and erasing. As shown in FIG. 3A, after programing some bits of the bit-alterable flash memory array and erasing some bits of the bit-alterable flash memory array, two different voltage distributions are formed. As shown in FIG. 3B, while the block is erased, all of the bits are "1." Then, some of the bits in this block can be programed to be "0." Next, some of the bits in this block can be erased to be "1." That is to say, the bit-alterable flash memory array can perform a bit erase operation (or a page erase operation).

Figure 4:
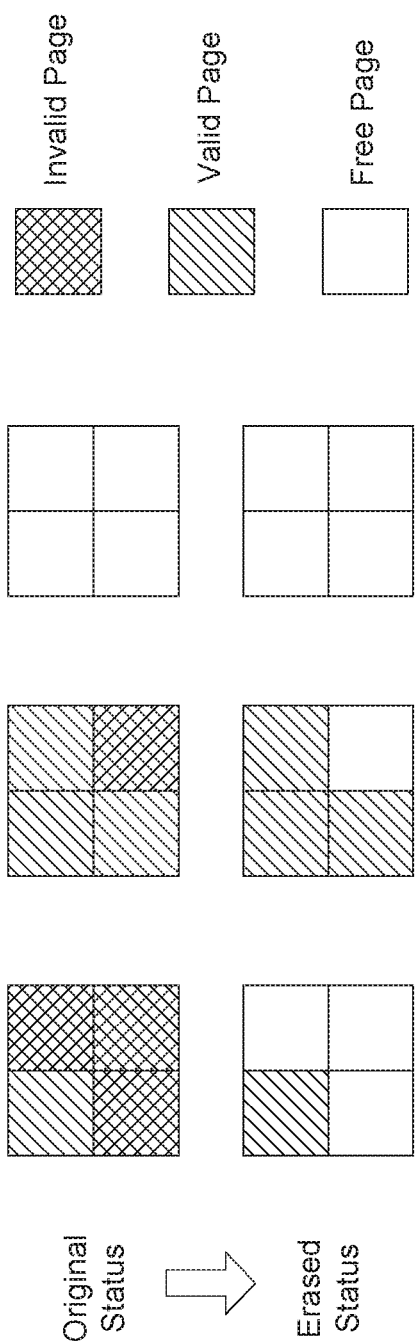
FIG. 4 illustrates a garbage collection procedure via a page erase operation.

Please refer to FIG. 4, which illustrates a garbage collection procedure via the page erase operation. In the page erase operation, one invalid page (or called used page) in one block can be individually erased to be a free page. The valid pages in this block are not needed to be migrated and only part of this block is erased to create free pages. The migration operation is omitted and the overhead is reduced.

As illustrated above, the memory array 400 of the flash memory device 1000 shown in FIG. 2 is a bit-alterable flash memory array. The program procedure and the garbage collection procedure can be performed via the bit erase operation, the page erase operation or the block erase operation. For efficiently executing the program procedure and the garbage collection procedure, a bit-alterable-aware management unit 210 is provided in the flash translation layer 200. As shown in FIG. 2, the bit-alterable-aware management unit 210 includes a hot-data-aware module 211, a latency-aware module 212, an in-place update module 213, an out-of-place update module 214 and a spreading module 215. The bit-alterable-aware management unit 210, the hot-data-aware module 211, the latency-aware module 212, the in-place update module 213, the out-of-place update module 214 and the spreading module 215 may be a circuit, a chip, a circuit board, program codes, or storage device storing program codes. Those elements are illustrated as follows.

Figure 5:
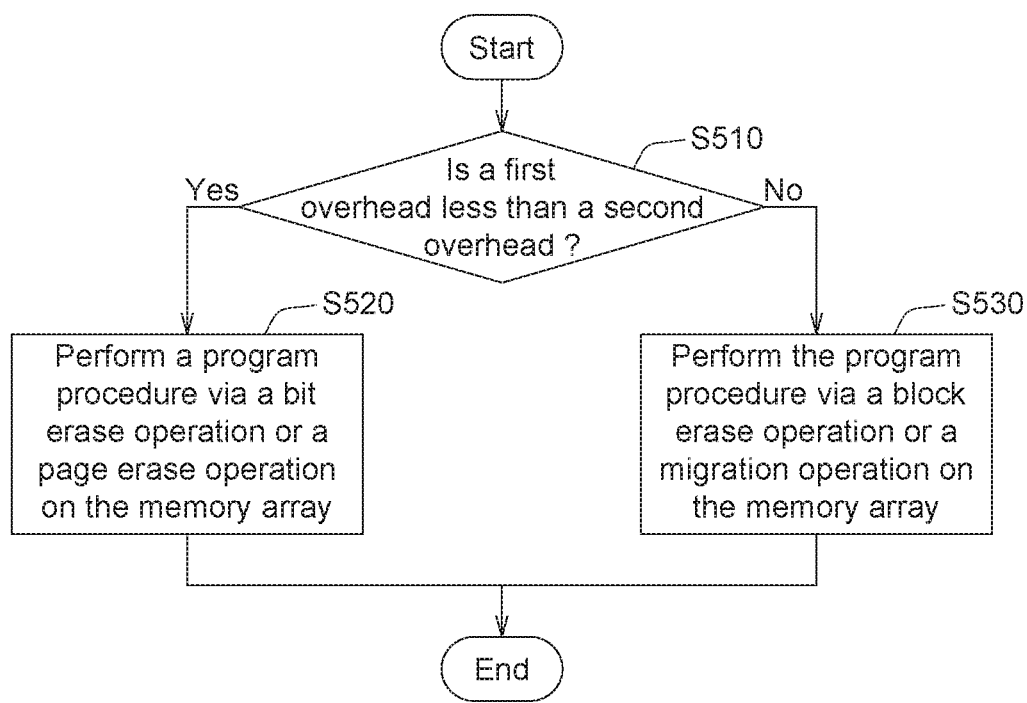
FIG. 5 shows a flowchart of a latency-aware program mechanism of a controlling method of the flash memory device.

Please refer to FIG. 5, which shows a flowchart of a latency-aware program mechanism of the controlling method of the flash memory device 1000. In step S510, the latency-aware module 212 determines whether a first overhead of the program procedure performed by the in-place update module 213 is less than a second overhead of the program procedure performed by the out-of-place update module 214. If the first overhead is less than the second overhead, the process proceeds to step S520; if the first overhead is not less than the second overhead, the process proceeds to step S530.

Figure 6:
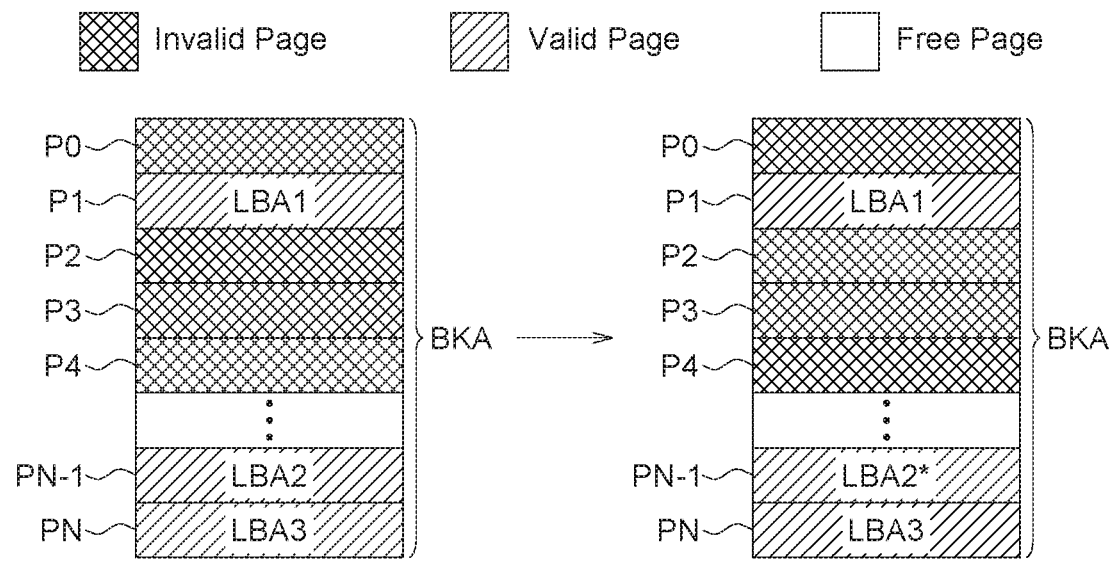
FIG. 6 illustrates a program procedure performed via the page erase operation.

In step S520, the in-place update module 213 performs the program procedure via the bit erase operation or the page erase operation on the memory array 400. For example, please refer to FIG. 6, which illustrates the program procedure performed via the page erase operation. In this example, "LBA2" in page PN-1 is needed to be replaced by "LBA2*." Before performing the program procedure, pages P0, P2, P3, P4, . . . are invalid pages, and pages P1, PN-1, PN are valid pages. After performing the program procedure, the page PN-1 in this block BKA is erased and then "LBA2*" is written in the page PN-1 in this block BKA.

Figure 7:
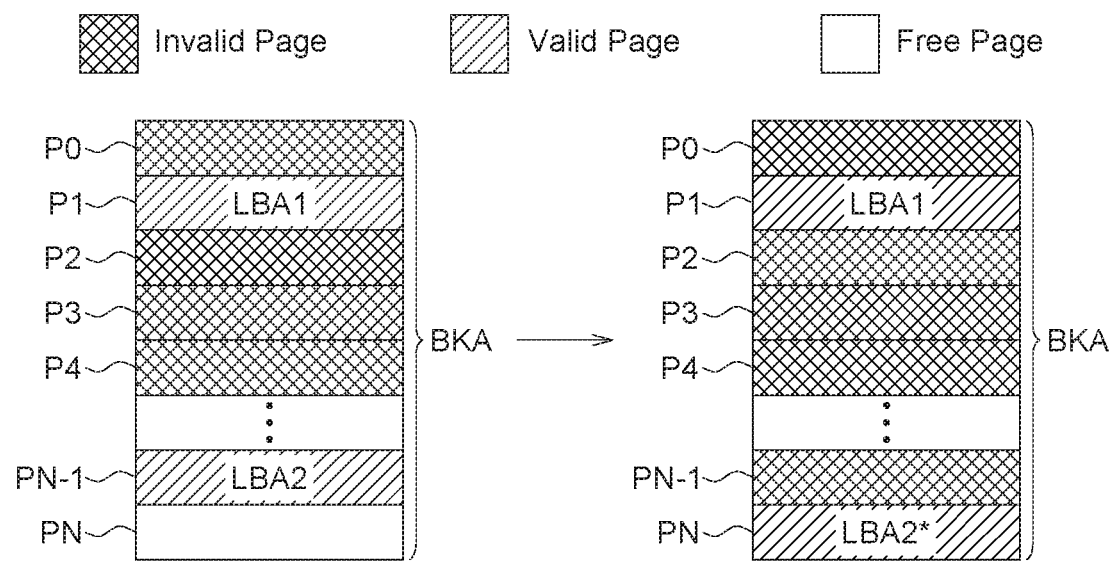
FIG. 7 illustrates the program procedure performed via a migration operation.

In step S530, the out-of-place update module 214 performs the program procedure via the block erase operation or the migration operation on the memory array 400. Please refer to FIG. 7, which illustrates the program procedure performed via the migration operation. In this example, "LBA2" in page PN-1 is needed to be replaced by "LBA2*." Before performing the program procedure, pages P0, P2, P3, P4, . . . are invalid pages, pages P1, PN-1 are valid pages and page PN is a free page. After performing the program procedure, the page PN-1 in this block BKA is read out and then "LBA2*" is written in the page PN in this block BKA. The page PN-1 becomes an invalid page and the page PN become a valid page.

Figure 8:
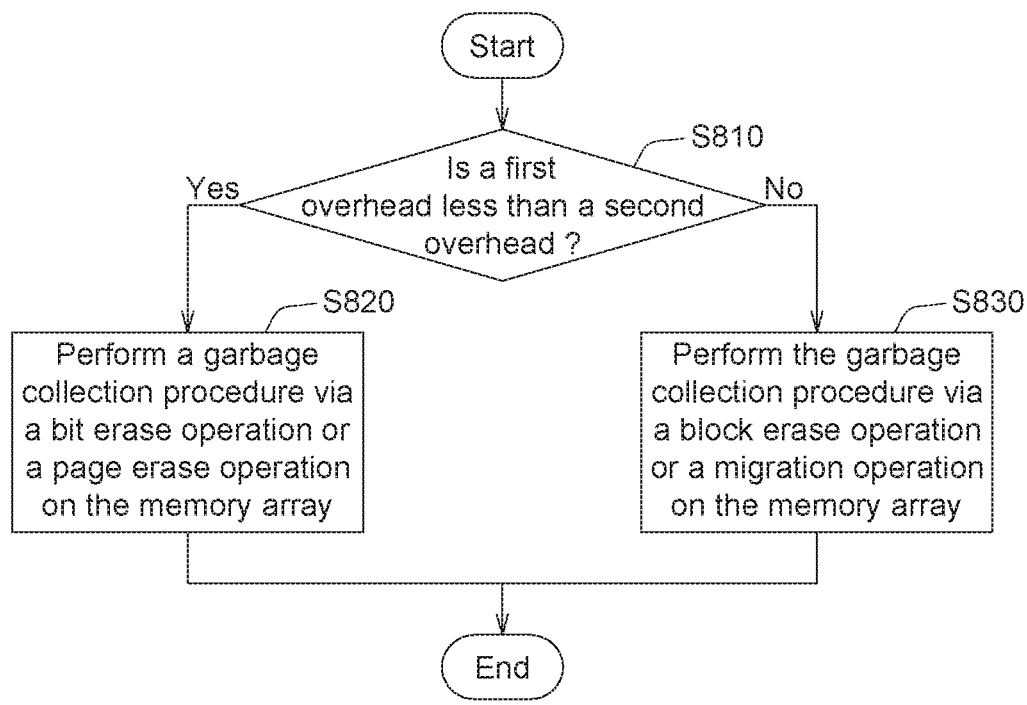
FIG. 8 shows a flowchart of a latency-aware garbage collection mechanism of the controlling method of the flash memory device.

Please refer to FIG. 8, which shows a flowchart of a latency-aware garbage collection mechanism of the controlling method of the flash memory device 1000. In step S810, the latency-aware module 212 determines whether a first overhead of the garbage collection procedure performed by the in-place update module 213 is less than a second overhead of the garbage collection procedure performed by the out-of-place update module 214. If the first overhead is less than the second overhead, the process proceeds to step S820; if the first overhead is not less than the second overhead, the process proceeds to step S830.

Figure 9:
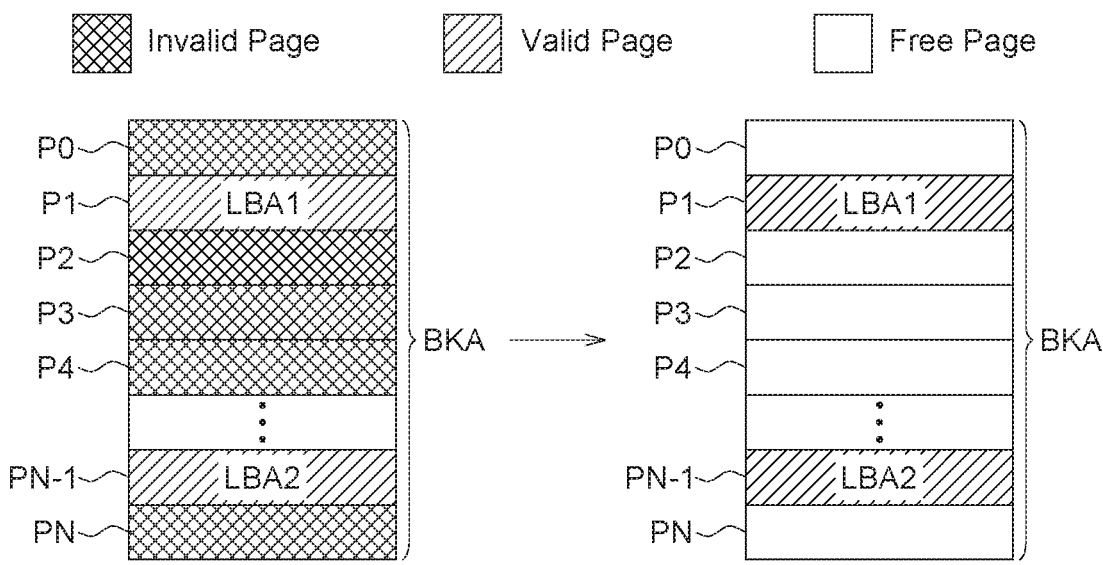
FIG. 9 illustrates a garbage collection performed via the page erase operation.

In step S820, the in-place update module 213 performs the garbage collection procedure via the bit erase operation or the page erase operation on the memory array 400. For example, please refer to FIG. 9, which illustrates the garbage collection procedure performed via the page erase operation. In this example, the space of the invalid pages is needed to be released. Before performing the garbage collection procedure, pages P0, P2, P3, P4, . . . , PN are invalid pages, and pages P1, PN-1 are valid pages. After performing the garbage collection procedure, the pages P0, P2, P3, P4, . . . , PN in this block BKA are erased to be free pages and the pages P1, PN-1 are kept at the same block BKA.

Figure 10:
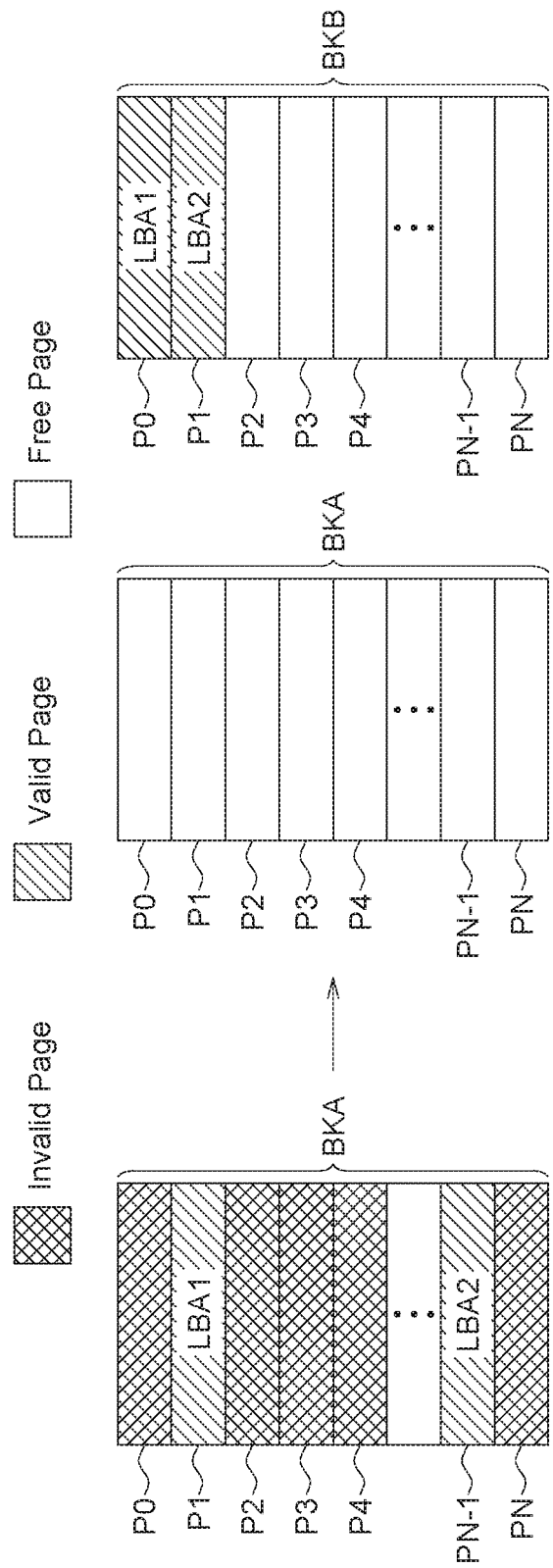
FIG. 10 illustrates the garbage collection procedure performed via the migration operation and the block erase operation.

In step S830, the out-of-place update module 214 performs the garbage collection procedure via the block erase operation or the migration operation on the memory array 400. Please refer to FIG. 10, which illustrates the garbage collection procedure performed via the migration operation and the block erase operation. In this example, the space of the invalid pages is needed to be released. Before performing the garbage collection procedure, pages P0, P2, P3, P4, . . . , PN are invalid pages, and pages P1, PN-1 are valid pages. After performing the garbage collection procedure, the pages P1, PN-1 in this block BKA are migrated to another block BKB and whole of the block BKA is erased.

Figure 11:
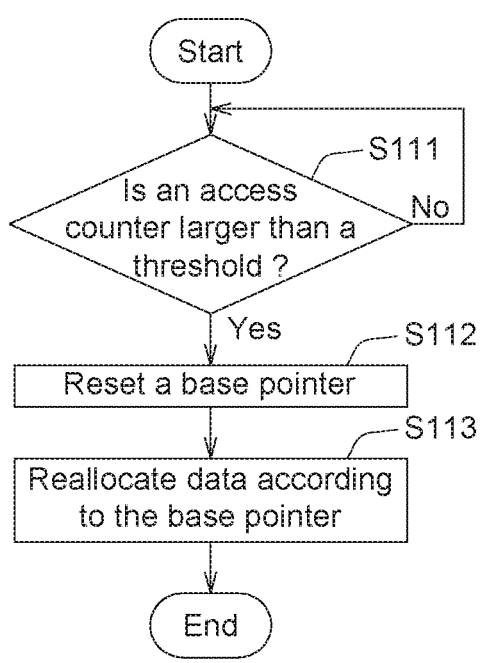
FIG. 11 shows a flowchart of a cyclic endurance spreading mechanism of the controlling method of the flash memory device.
Figure 12:
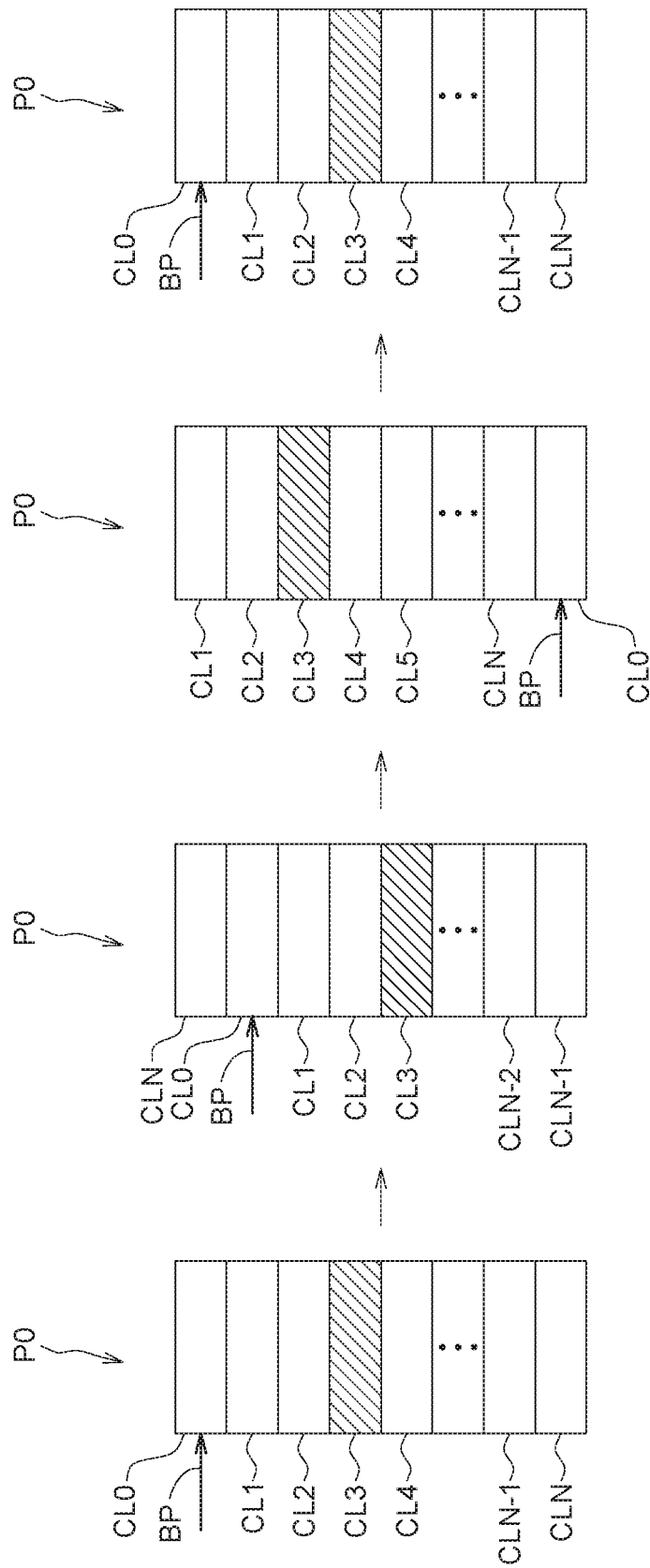
FIG. 12 illustrates the steps in FIG. 11.

Please refer to FIGS. 11 and 12. FIG. 11 shows a flowchart of a cyclic endurance spreading mechanism of the controlling method of the flash memory device 1000. FIG. 12 illustrates the steps in FIG. 11. In step S111, the spreading module 215 determines whether an access counter is larger than a threshold. If the access counter is larger than the threshold, the process proceeds to step S112; if the access counter is not larger than the threshold, the process returns to step S111.

In step S112, the spreading module 215 resets a base pointer BP. For example, as shown in FIG. 12, the pages P0 includes cache lines CL0 to CLN. The base pointer BP is moved from the first physical row to the second physical row.

In step S113, the spreading module 215 reallocates data according to the base pointer BP. For example, as shown in FIG. 12, the data in the cache line CL0 is moved from the first physical row to the second physical row according to the base pointer BP.

As shown in FIG. 12, the base pointer BP is cyclically moved, such that the endurance is spread among all of the cache lines CL0 to CLN.

Figure 13:
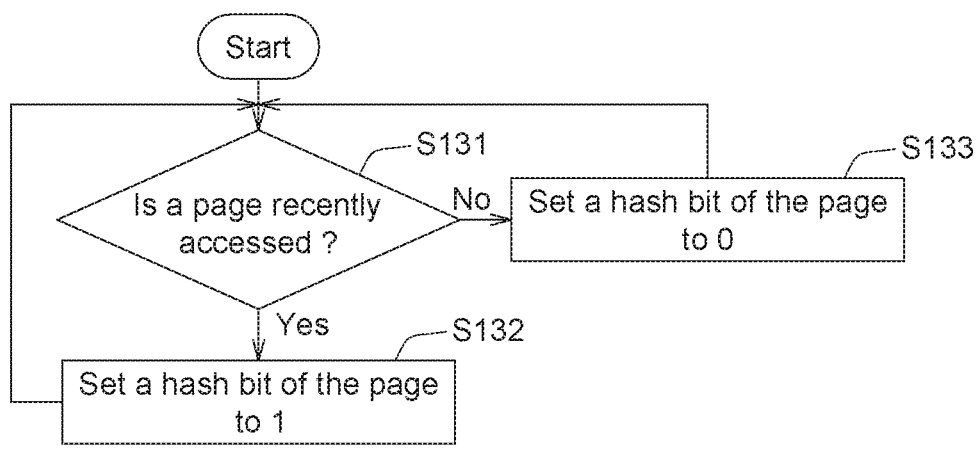
FIG. 13 shows a flowchart of a hot-data-aware fine-granularity mechanism of the controlling method of the flash memory device.

Please refer to FIS. 13 and Table I. FIG. 13 shows a flowchart of a hot-data-aware fine-granularity mechanism of the controlling method of the flash memory device 1000. Table I is a Hash table whose data is searched by a hash function, such as mod 4. In step S131, the hot-data-aware module 211 determines whether a page is recently accessed. If the page is recently accessed, the process proceeds to step S132; if the page is not recently accessed, the process proceeds to step S133.

TABLE I

| | Hot data base pointer BP | | | |
|---|---|---|---|---|
| | "LBA0"<br>Page #0,<br>Block #0<br>cache line #0 | "LBA5"<br>Page #1,<br>Block #1<br>cache line #2 | "LBA6"<br>Page #3,<br>Block #3<br>cache line #5 | "LBA7"<br>Page #0,<br>Block #5<br>cache line #0 |
| access counter | 100 | 1000 | 300 | 500 |
| hash bit | 1 | 0 | 0 | 1 |

In step S132, the hot-data-aware module 211 sets a hash bit of this page to 1. In step S132, the hot-data-aware module 211 sets the hash bit of this page to 0.

According to the embodiments descried above, a novel Flash Translation Layer (FTL) having the latency-aware program mechanism, the latency-aware garbage collection mechanism, the cyclic endurance spreading mechanism and the hot-data-aware fine-granularity mechanism is provided to exploit the bit erase operation or the page erase operation of the bit-alterable flash memory array for resolving the latency and endurance issues.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A flash memory device, comprising:
   a memory array;
   an in-place update module, used for performing a program procedure or a garbage collection procedure via a bit erase operation or a page erase operation on the memory array;
   an out-of-place update module, used for performing the program procedure or the garbage collection procedure via a block erase operation or a migration operation on the memory array; and
   a latency-aware module, used for determining a relationship between a first overhead of the in-place update module and a second overhead of the out-of-place update module.

2. The flash memory device according to claim 1, wherein if the first overhead is less than the second overhead, the in-place update module is controlled to perform the program procedure or the garbage collection procedure.

3. The flash memory device according to claim 2, wherein during the program procedure performed by the in-place update module, a page in a block is erased and then data is written in the page.

4. The flash memory device according to claim 1, wherein during the garbage collection procedure performed by the in-place update module, at least one invalid page in a block is erased to be a free page and at least one valid page in the block is kept.

5. The flash memory device according to claim 1, wherein if the first overhead is not less than the second overhead, the out-of-place update module is controlled to perform the program procedure or the garbage collection procedure.

6. The flash memory device according to claim 5, wherein during the garbage collection procedure performed by the out-of-place update module, at least one valid page in a block is migrated to another block and whole of the block is erased.

7. The flash memory device according to claim 5, wherein during the program procedure performed by the out-of-place update module, a page in a block is read out and then data is written in another page.

8. The flash memory device according to claim 1, further comprising:
   a spreading module, used for resetting a base pointer, and reallocating data according to the base pointer if an access counter is larger than a threshold.

9. The flash memory device according to claim 8, further comprising:
   a hot-data-aware module, used for setting a hash bit of a page to 1, if the page is recently accessed.

10. The flash memory device according to claim 9, wherein the in-place update module, the out-of-place update module, the spreading module and the hot-data-aware module are arranged in a flash translation layer.

11. A controlling method of a flash memory device, wherein the flash memory device includes a memory array, an in-place update module, an out-of-place update module and a latency-aware module, the in-place update module is used for performing a program procedure or a garbage collection procedure via a bit erase operation or a page erase operation on the memory array, the out-of-place update module is used for performing the program procedure or the garbage collection procedure via a block erase operation or a migration operation on the memory array, and the controlling method comprises:
   determining, by the latency-aware module, a relationship between a first overhead of the in-place update module and a second overhead of the out-of-place update module.

12. The controlling method according to claim 11, further comprising:
   performing, by the in-place update module, a program procedure or a garbage collection procedure via a bit erase operation or a page erase operation on the memory array, if the first overhead is less than the second overhead.

13. The controlling method according to claim 12, wherein during the program procedure performed by the in-place update module, a page in a block is erased and then data is written in the page.

14. The controlling method according to claim 12, wherein during the garbage collection procedure performed by the in-place update module, at least one invalid page in a block is erased to be a free page and at least one valid page in the block is kept.

15. The controlling method according to claim 11, further comprising:
   performing, by the out-of-place update module, the program procedure or the garbage collection procedure via a block erase operation or a migration operation on the memory array, if the first overhead is not less than the second overhead.

16. The controlling method according to claim 15, wherein during the program procedure performed by the out-of-place update module, a page in a block is read out and then data is written in another page.

17. The controlling method according to claim 15, wherein during the garbage collection procedure performed by the out-of-place update module, at least one valid page in a block is migrated to another block and whole of the block is erased.

18. The controlling method according to claim 11, further comprising:
   determining, by a spreading module, whether an access counter is larger than a threshold;
   resetting, by the spreading module, a base pointer if the access counter is larger than the threshold; and
   reallocating data according to the base pointer.

19. The controlling method according to claim 18, further comprising:
   determining, by a hot-data-aware module, whether a page is recently accessed; and
   setting, by the hot-data-aware module, a hash bit of the page to 1, if the page is recently accessed.

20. The controlling method according to claim 19, wherein the in-place update module, the out-of-place update module, the spreading module and the hot-data-aware module are arranged in a flash translation layer.

* * * * *